United States Patent Office 3,553,158
Patented Jan. 5, 1971

3,553,158
POLYMER COMPOSITIONS CONTAINING TALC FILLER, POLAR ORGANIC COMPOUND AND ANTIOXIDANT
Evelyn G. Gilfillan, Audubon, N.J., assignor to Shell Oil Company, New York, N.Y., a corporation of Delaware
No Drawing. Filed Aug. 30, 1968, Ser. No. 756,425
Int. Cl. C08f 45/04, 45/58
U.S. Cl. 260—41                                    13 Claims

ABSTRACT OF THE DISCLOSURE

In polypropylene compositions containing substantial amounts of talc as filler, the talc seriously decreases the oxidation stability of compositions containing conventional antioxidant systems. It has been found that this degrading effect is due to selective sorption of the antioxidants on the talc while the polymer composition is melted, as it normally is during some stages of processing. According to this invention, the stability of talc-filled polypropylene or other hydrocarbon polymer compositions is preserved by including as a "talc-deactivator" a polar organic compound which is selectively sorbed on the talc to the substantial exclusion of the antioxidants present in the composition, while not exerting a degrading action on the polymer composition.

---

The inclusion of talc as a filler in polyolefin compositions is desirable for various reasons. Certain talc-filled compositions, for example, have been disclosed by Fischer in U.S. Pat. 3,157,614 to have increased dielectric strength due to the inclusion of a selected type of talc.

Particularly useful are compositions in which the sole or predominant polymeric component is polypropylene or a modified polypropylene. Such compositions exhibit greater stiffness and superior retention of physical properties at elevated temperatures, if properly stabilized, than polypropylene itself. Due to its relatively high heat distortion temperature, polypropylene is useful in applications in which it may be exposed to the atmosphere at relatively high temperatures. It is desirable that polymers intended for such uses have a high end use stability. It is also known that polypropylene itself is subject to rapid degradation under the influence of oxygen at elevated temperatures. This degradation is largely prevented by inclusion of antioxidant stabilizer compositions in the polymer. Stability against degradation due to the action of oxygen at elevated temperatures is generally designated "thermal stability."

Many antioxidant stabilizers and stabilizer systems for polyolefins have been in patents and other literature, and a variety of such compounds are in commercial use. The combinations which have found widest acceptance consist of a primary antioxidant, e.g., a hindered phenolic compound, and a secondary or synergistic antioxidant, e.g., an alkyl thiodipropionate. The primary antioxidant acts as a free radical scavenger or chain terminating agent; the secondary antioxidant is generally believed to function through a mechanism of peroxide decomposition. Different combinations of various primary and secondary antioxidants are used to impart the various desired levels of oxidative stability to polymer compositions intended for different uses and hence requiring different degrees of stability against oxidative degradation.

The addition of talc in substantial amounts to polypropylene compositions stabilized against thermal degradation was found to drastically reduce the thermal stability of the filled compositions, often to a level no higher than that of the unstabilized polymer. It is the primary object of the present invention to provide a method for restoring the thermal stability of polyolefin compositions containing talc as an added component, and to provide thermally stable talc-filled polyolefin compositions, particularly those in which polypropylene or a modified polypropylene is the sole or dominant polymer component.

It was found in studies of the effect of talc as a filler in polypropylene that the addition of 67 phr. (parts per hundred parts of resin, by weight) of various types of talcs to a thermally stabilized polypropylene composition reduced the oxidation stability [1] of the composition by 70 to 98%, depending upon the type of talc used.

No explanation had heretofore been given for such a drastic degrading effect due to talc, and several hypotheses were available as to possible mechanisms. Depending on the mechanism involved, different measures would be required to counteract the effect.

A prime candidate for the cause of the degrading effect of added talc was the presence of metal compounds as impurities in the talc, which might function as pro-degradants by promoting hydroperoxide decompositions to free radical products. This effect should be compensable by the addition of metal-complexing agents. To test this hypothesis, a number of compounds which are known to act as metal complexing agents in polymers were added to talc-filled stabilized polypropylene compositions and their effectiveness in improving the oxidation stability of the mixtures tested. The observed differences in effectiveness did not appear to be related to intrinsic complexing ability. It was also found that there was no apparent correlation between stability and contaminant level. This suggested that those complexing agents which proved effective did not owe their effectiveness to their metal-complexing ability.

A second possible hypothesis to explain the degrading effect of talc was to ascribe the effect to the changes in efficacy of the stabilizers due to the high alkalinity of the talc. If this were the prevailing mechanism, it would be expected that addition of acidic compounds would be most effective in counteracting the degrading effect. In testing of numerous compounds, no such correlation with acidity was observed.

A third possible hypothesis to explain the degrading effect of talc was that adsorption of oxygen on the talc particles resulted in a higher than normal oxygen concentration in the polymer. This effect would be expected to correlate directly with the talc particle size, but no such correlation was observed in a study of six different talcs, having average particle sizes from 0.5 to 7 microns.

Further studies suggested still another mechanism, which is believed to be the predominant one in the degrading action of talc on oxidation stability of stabilized

---

[1] Oxidation stability is reported, for purposes of the present disclosure and claims, as "oven life at 150° C." measured in days. The test is carried out by preparing plaques of specified thickness by compression molding and aging them to failure in a circulating air oven held at 150° C. The plaques are considered to fail when surface powdering is observed. The test is run on at least three plaques from each composition. The reported oxidation stability is the mean oven life, in days, of all the tested plaques of a single thickness prepared from a given formulation.

polyolefin compositions. It appears that conventional polyolefin stabilizers are sorbed on the surface of the added talc while the polymer composition is in the melt state. Conversion to a melt and subsequent solidification occur as process steps in the production of stabilized, filled polyolefin compositions, and generally also in the conversion thereof to useful articles as by injection molding, extrusion, blow molding, etc. Accordingly, the melted and resolidified polymer compositions containing substantial amounts of talc are left defenseless against the attack of oxygen because most or all of the stabilizer is firmly held by the talc.

It has now been found that a variety of organic polar compounds can counteract this sorption mechanism by being themselves preferentially sorbed by the talc. For purposes of convenient reference, such effective compounds are herein designated "talc deactivators."

It is thought that the sorption of both the antioxidant compounds and the talc deactivators is due to bonds created between their polar functional groups and oxide or hydroxyl groups on the talc surface, but it has not been possible, to date, to predict strictly on the basis of chemical structure which organic polar compounds will be effective talc deactivators and which will not. However, once the mechanism is known, it is easy to select a group of compounds of which the predominant number will prove to be effective. The selection can be made either by empirical testing or by determining the relative sorbability on talc of the candidate compound and the desired antioxidant composition in a hydrocarbon solution.

In addition to preferential sorbability, the effective talc deactivators also have to be sufficiently non-volatile to remain in the polymer during processing. This factor is automatically taken into account when oxidation stability testing is carried out by determining oven life at 150° C., since excessively volatile compounds are quickly lost under these conditions.

Another necessary quality of effective talc deactivators is their ability to act without adversely affecting optical and odor characteristics of the polymer composition. It was found, for example, that some compounds which might otherwise be effective caused discoloration of the composition during processing or aging. Such compounds are not acceptable for use in this invention. Compounds in this category are zinc dibenzyldithiocarbamate, zinc dibutyldithiocarbamate, salicylidene hydrazine of salicylic acid.

The following examples are presented to illustrate preferred modes of practicing this invention and also to provide some of the data underlying the above discussion of the mechanism by which the stabilizers and talc deactivators act.

Unless otherwise stated, the polymer employed in these examples is polypropylene prepared by polymerization of propylene by contact with a $TiCl_3$-aluminum alkyl catalyst, and characterized by the following properties:

Melt flow, gm./10 min. _____ About 4
Density at 73° F. _____ 0.905
Tensile yield, p.s.i., at 0.2 in./min. _____ 4500
Catalyst residue, p.p.m. _____ <30

The unstabilized polymer has an oven life of 1 day and 3 days, when tested in 10 mil and 110 mil plaques, respectively, at 150° C.

The compositions are typically prepared by mixing powdered polypropylene, talc, and specified types and amounts of stabilizers and talc deactivators in a sigmoid blade rotary type of mixer (Brabender Plasticorder) under a nitrogen blanket. Specimens of each formulation are compression molded into plaques of 10 and 110 mil thickness.

The talcs employed in the examples are characterized as follows:

| | Trade name | Average particle size μ | Metal content, Fe+Al percent wt. |
|---|---|---|---|
| Code type: | | | |
| A | Desertalc 57 | 6 | 1.57 |
| B | Mistron vapor | 1 | 1.0 |

EXAMPLE 1

This example illustrates the effectiveness of a number of polar organic compounds as talc-deactivating agents in polypropylene compositions containing 3 parts by weight polypropylene, 2 parts by weight of talc A, 0.25 phr. of 4-methyl - 2,6 - di-tert-butylphenol, 0.12 phr. 1,3,5-trimethyl - 2,4,6 - tri(3,5 - di-tert-butyl-4-hydroxybenzyl) benzene, about 0.5 phr. of dialkylthiodipropionates and 0.1 phr. of calcium stearate.

Numerous compounds were tested as talc-deactivators in the above compositions, the tests being for oven life at 150° C. both in 10 mil and 110 mil plaques. The order of effectiveness indicated by these two tests is in most cases very similar, the minor differences probably being accounted for by differences in volatility. The data are recorded in Table 1, the talc deactivators being listed in decreasing order of effectiveness, based on the 100 mil plaque data.

In the absence of talc, the polypropylene composition had an oven life of 100 days, tested on 110 mil plaques and 60 days, tested on 10 mil plaques. In the presence of talc and without talc deactivator, these values decreased to 14 days and 9 days, respectively.

TABLE 1

| Talc deactivating compound | | | Oven life at 150° C. | | |
|---|---|---|---|---|---|
| Type | Name | Trade name | Concentration, phr. | 110 mil specimen | 10 mil specimen |
| Highly effective: | | | | | |
| Polyepoxide | Condensation products of 2,2-bis(4-hydroxyphenyl) propane [bisphenol A] and epichlorohydrin. | | | | |
| | Product of Durrans, melting point 75-85° C | Epon ® resin 1002 | 1.0 | 105 | 67 |
| | Product of Durrans, melting point 65-75° C | Epon resin 1001 | 1.0 | 98 | 66 |
| Amide | N,N'-ethylene-bis-stearamide | Microtomic 280 wax | 1.0 | 87 | 50 |
| Polyepoxide | Liquid product, predominantly diglycidyl ether of bisphenol-A. | Epon resin 828 | 1.0 | 76 | 61 |
| Amide | Condensation products of diethanolamine and carboxylic acids. | Alromine R-100 | 1.0 | 75 | 55 |
| Aliphatic polyol | Mannitol | | 1.0 | 66 | 52 |
| | Mixture of sodium benzoate and sodium dioctyl sulfosuccanate. | Aerosol OT-B | 1.0 | 64 | 45 |
| Moderately effective: | | | | | |
| Aliphatic polyol | Glycerine | | 1.0 | 58 | 45 |
| Aliphatic polyol | Polyethylene glycol M.J. ca. 6000 | Carbowax 6000 | 1.0 | 54 | 35 |
| Aliphatic polyol | M.W. ca. 400 | Carbowax 400 | 1.0 | 49 | 40 |
| Acrylate polymer | Polymethyl methacrylate | | 1.0 | 49 | 47 |
| Amide | N,N'-disalicylidene-1,2-propane diamide | duPont metal deactivator | 1.0 | 47 | 43 |
| Amino benzoic acid | O-amino benzoic acid | | 1.0 | 43 | 37 |
| Amino benzoic acid | p-Aminobenzoic acid | | 1.0 | 43 | 36 |
| Sulfide | Bis(dimethylthio-carbamyl)disulfide | | 1.0 | 43 | 35 |
| Polyepoxide | Aliphatic polyepoxide | Epon resin 812 | 1.0 | 43 | 27 |

EXAMPLE 2

In a different series of experiments, utilizing the same polymer and as in Example 1 and testing only on 110 mil plaques, compositions were tested in which some contained 40% wt. of talc A and some 40% of talc B.

In those compositions in which effective talc deactivators were present, the oven life of the compositions containing talc B was typically about 50% of that of compositions containing talc A.

In the absence of talc, the composition had an oven life of 100 days. Talc A reduced this to 9 days and talc B to 2 days. In compositions containing 1 phr. of various effective talc deactivators, the oven life of the compositions containing talc A was between 44 and 52 while that of compositions containing talc B and identical talc deactivators was between 21 and 35.

Compounds which were effective talc deactivators in these compositions included p-aminobenzoic acid and N,N'-di(beta-hydroxyethyl)glycine.

EXAMPLE 3

Another group of polar organic compounds was tested for effectiveness as talc deactivating agents in a differently stabilized polypropylene composition, consisting of 3 parts by weight polypropylene, 2 parts by weight of talc A, and a combination of 0.1 phr. of 1,3,5-trimethyl-2,4,6-tri(3,5-di-tert-butyl-4-hydroxybenzyl)benzene, 0.25 phr. of dilaurylthiodipropionate and 0.1 phr. calcium stearate. These tests were carried out only on 10 mil plaques. The composition has an oven life of 40 days in the absence of talc and 2 days in the presence of 40% of talc A but without added talc deactivator.

The results of the tests are set out in Table 2.

polymer or the filtrate, demonstrating that they had been effectively removed from the composition by the talc.

A series of experiments on the polymer composition of Example 3, without talc deactivator, demonstrated that polymer stability decreased essentially monotonically as the concentration of talc A in the composition increased from 10 to about 40%. It was also found that a small amount of talc, up to about 10% of the composition, did not remove sufficient antioxidant to significantly decrease the stability of the composition. The limit below which no significant effect is observed will be different for different antioxidant types and proportions.

This invention is of particular utility when the polymer component of the composition is polypropylene because that polymer is often employed in the production of articles to be used at elevated temperatures, in which thermal stability is especially important. The invention is similarly useful in compositions in which polypropylene is modified by the addition of another polymer, e.g., an elastomer, to impart impact resistance at low temperature, or in which the structure of polypropylene is modified by inclusion of a small proportion of another monomer during polymerization, to provide a random copolymer or a block copolymer structure. These polymers are typically prepared with Ziegler-Natta type catalysts, such as combinations of titanium trichloride and aluminum alkyls. They typically contain less than 30 p.p.m., often only a few p.p.m., expressed as metal, of catalysts residue. The invention is also of use in other polyolefins, particularly those which have good temperature resistance, such as poly-(4-methylpentene-1). The polyolefins are a well known group of polymers generally derived from olefins of 2–8 carbon atoms per molecule. The invention is also useful in other thermoplastic hydrocarbon polymers, e.g.,

TABLE 2

| Talc deactivating compound | | | | Oven life at 150° C. | |
|---|---|---|---|---|---|
| Type | Name | Trade name | Concentration, phr. | 110 mil specimen | 10 mil specimen |
| Epoxide | Octyl epoxystearate | Draplex 3.2 | 1.0 | | 48 |
| Ester | Sucrose benzoate | | 1.0 | | 38 |
| Aliphatic amine | Stearylamine | Kemamine P-990 | 1.0 | | 36 |
| Polyepoxide | Liquid condensation product of bisphenol-A and epichlorohydrin. | Epon resin 828 | 1.0 | | 33 |
| Ester | Polyethylene glycol dibenzoate | Benzoflex P-200 | 1.0 | | 32 |
| Polyester | Polyester of M.W. ca. 1000 | Plastolein 9722 | 1.0 | | 32 |
| Aliphatic amine | N,N,N',-tetrakis(2-hydroxypropyl)ethylenediamine. | Quadrol | 1.0 | | 30 |
| Amide | Oleamide | Slip-eze | 1.0 | | 21 |
| Polyether | Poly(oxypropylene glycol ethylene oxide) | Pluronic L-31 | 1.0 | | 20 |

EXAMPLE 4

The above postulated mechanism of effectiveness of talc deactivators was studied in a series of experiments of which some representative results are reported herein.

The amount of various compounds sorbed by talc A from $10^{-4}$ molar solutions of the compounds in hexane, at 25° C., was determined. It was found that conventional polyolefin antioxidants which were hindered phenols were sorbed to a moderate extent, e.g., 0.17 and 0.37 micromole per gram of talc and others, which contained ester or sulfide linkages, were sorbed to a more substantial extent, ranging from 2.3 to 3.6 micromoles per gram of talc. The latter value was obtained on dilaurylthiodipropionate. It was also found that the extent of sorption increases with increasing temperature of the experiment, and is less, at a given temperature, in a more viscous liquid.

That talc removes antioxidant from a polymer composition was confirmed by preparing a composition of the kind described in Example 3, but free of talc deactivator, dissolving the polymer in hot xylene, removing the talc by filtration, precipitating the polymer with heptane, and testing the polymer and the filtrate by infrared and ultraviolet spectrophotometry for the presence of the antioxidants which had originally been added. No evidence of the antioxidant components was found either in the polyethylene, polystyrene and ABS (acrylonitrile-butadiene-styrene copolymer).

Talcs suitable for use as fillers in polypropylene and similar hydocarbon polymer compositions vary in particle shape, particle size, and contaminant content. The four particle types are fibrous or foliated, tremolitic or acicular, platy or micaceous, and granular. They are described in greater detail in the literature, including the above-mentioned Fischer patent U.S. 3,157,614. Fischer states that a platy talc imparts certain desirable dielectric properties to the composition. Compositions according to the present invention may contain talcs having any of the four types of particles. For reasons not concerned with stability, acicular-platy talc is preferred in some polypropylene compositions. The amount of talc employed in the polymer-filled composition is suitably in the range from 0.1 to 0.8 part by weight per part of polymer, which corresponds to about 9 to about 44% by weight of the total composition.

In providing stabilized talc-filled polymer compositions according to this invention, a wide variety of antioxidant compositions is available for choice, including numerous commercial primary and secondary antioxidants. It is preferred to employ, to the extent that it is feasible, antioxidant stabilizers which are poorly sorbable on talc. It has been found that antioxidants in which the only non-hydrocarbon groups are hindered phenolic groups are sorbed to a lesser extent, at given conditions, than antioxidants which contain ester groups, and are therefore generally preferred as primary antioxidants in compositions of this invention. The following are illustrative.

Preferred primary stabilizers are hindered phenols in which a branched alkyl group, such as a tertiary butyl group, is attached to each of the two positions adjacent the phenolic —OH. Preferred antioxidants of this type, and their combination with preferred secondary antioxidants, are described in U.S. Pat. 3,190,852 to Doyle. That patent refers for more details of preferred primary antioxidants to U.S. 3,053,803 to Jaffe et al., 3,026,264 to Rocklin et al., 3,062,895 to Martin et al., and 3,047,503 to Jaffe et al. The disclosures of these patents are incorporated herein by reference.

Effective antioxidant stabilizing compositions typically increase the oven life of the polymer from a value of less than about 5 days, tested on 110 mil plaques at 150° C., to over 40 days.

A preferred member of the group is 1,3,5-trimethyl-2,4,6-tri(3,5 - di - tert-butyl-4-hydroxybenzyl)benzene. A more volatile hindered phenol, which may be employed as such or in combination with another primary antioxidant, such as one of the above hindered phenols, is 2,6-di-tert-butyl-4-methylphenol.

Other hindered phenols are 1,1,3-tris(3-methyl - 4 - hydroxy - 5 - tert-butylphenyl)butane and dioctadecyl paracresol.

A primary antioxidant which is relatively more strongly sorbed by talc is the ester type antioxidant tetra-[3-(3, 5-di-tert - butyl - 4 - hydroxyphenyl)propionate] of pentaerythritol. Another ester type antioxidant is octadecyl-3(3, 5-di-tert-butyl-4-hydroxyphenyl)propionate.

The preferred group of secondary stabilizers are dialkylthiodipropionates in which the alkyl groups typically are the lauryl or stearyl group, although the $C_{12}$ or higher alkyl groups are also suitable. These and other suitable secondary antioxidants are described in greater detail in said Doyle patent and are known to persons skilled in this art.

The talc deactivating compounds of the present invention can be selected from a wide variety of organic polar compounds. Among the most effective and preferred are epoxides, particularly polyepoxides; amides; acrylate polymers; and aliphatic polyols. These types of compounds are well known to organic chemists and nothing would be added to this disclosure by enumerating large numbers of them. Preferred compounds of these types are illustrated in Tables 1 and 2. Not all compounds of these types are equally effective, as will be evident from the examples.

In general, suitable talc deactivating compounds will have a molecular weight greater than about 300; will contain one or more polar groups such as epoxide, aliphatic hydroxyl, ester, amide, ether or sulfide; and will preferably contain a non-polar organic group which makes them at least moderately compatible with the polymer, such as lauryl or stearyl.

I claim as my invention:

1. The method of stabilizing against oxidative degradation a composition comprising a thermoplastic hydrocarbon polymer, talc filler and antioxidant of which:
   (a) the talc-free polymer composition, containing from about 0.01 to about 5 phr. of an incorporated antioxidant stabilization composition, has an oven life measured at 150° C. on 110 mil thick plaques greater than 40 days; and
   (b) the talc-containing polymer composition containing only said antioxidant stabilization composition has an oven life less than 50% of that of said talc-free polymer composition;
which comprises incorporating in the total composition, prior to a melting and solidification step, from 0.1 to 5 phr. of a talc-deactivating organic compound which is not itself sufficient to substantially improve the anti-oxidant stability of said stabilized composition in the absence of said talc but is effective to improve the oven life of said composition to a value above about 40 days when the composition contains said talc, said organic compound being selected from the group consisting of polar organic compounds which contain at least one of the following polar groups; epoxide, aliphatic hydroxyl, ester, amide, ether and sulfide, have a molecular weight in excess of 300, are selectively sorbed by said talc in the presence of said antioxidant stabilization composition while the polymer composition is melted, and do not discolor said polymer during processing.

2. The method according to claim 1 in which said polymer is polypropylene, said talc is an acicular-platy talc, present in an amount in excess of 10% by weight of the composition, said antioxidant composition comprises essentially a phenolic primary antioxidant and a dialkylthiodipropionate, and said talc-deactivating compound is selected from the group consisting of polyepoxides, amides, acrylate polymers and aliphatic polyols.

3. An oxidative-degradation stable composition comprising a thermoplastic hydrocarbon polymer, from 0.1 to about 0.8 parts by weight of talc per part of polymer, and
   (a) a combination of antioxidant stabilizers which, in the absence of said talc, stabilize said composition against oxidation as indicated by an increase in its oven life to at least about 40 days and in the presence of said talc increase the oven life of said composition measured at 150° C. on 110 mil thick plaques to less than 50% of the oven life in the absence of said talc; and
   (b) from 0.1 to 5 phr., sufficient, in combination with said combination of antioxidant stabilizers, to increase the oven life of said talc-containing composition to at least about 40 days, of an organic compound selected from the group consisting of polar organic compounds which contain at least one of the following polar groups: epoxide, aliphatic hydroxyl, ester, amide, ether and sulfide, have a molecular weight in excess of 300, are selectively sorbed by said talc in the presence of said antioxidant stabilization composition while the polymer composition is melted, and do not discolor said polymer during processing.

4. A composition according to claim 3 in which said polymer is polypropylene, said talc is an acicular-platy talc, said combination of antioxidant stabilizers comprises essentially a phenolic primary antioxidant and a dialkylthiodipropionate, and said talc-deactivating compound is selected from the group consisting of polyepoxides, amides, acrylate polymers and aliphatic polyols.

5. An oxidative-degradation-stable polypropylene composition comprising, per 100 parts by weight of solid polypropylene:
   (a) from 10 to 80 parts by weight of talc,
   (b) from about 0.01 to about 5 phr. of an antioxidant stabilization composition comprising:
      (i) at least one primary antioxidant selected from the group consisting of 1,3,5-trimethyl-2,4,6-tri(3,5-di-tert-butyl-4 - hydroxybenzyl) benzene; 2,6-di-tert-butyl-4-methylphenol; 1,1,3 - tris(3-methyl - 4 - hydroxy-5-tert-butylphenyl)butane; dioctadecyl paracresol; tetra[3(3,5-di-tert-butyl-4-hydroxyphenyl) propionate] of pentaerythritol; and octadecyl-3(3,5-di-tert-butyl-4-hydroxyphenyl)propionate; and
      (ii) at least one secondary antioxidant selected from the dialkylpropionates in which the alkyl groups contain from 12 to 18 carbon atoms per molecule; and
   (c) from 0.1 to 5 phr. of a talc-deactivating organic compound selected from the group consisting of polyepoxides, amides, acrylate polymers and aliphatic polyols which are selectively sorbed by said talc in the presence of said antioxidant stabilization composition while the polymer composition is melted and which do not discolor said polymer during processing.

6. A composition according to claim 5 in which said talc-deactivating compound is a polyepoxide condensation product of 2,2-bis-(4-hydroxyphenyl) propane and epichlorohydrin, selected from those which are liquid at ambient temperature and those having a Durrans melting point not in excess of 85° C.

7. A composition according to claim 6 in which said primary antioxidant is 1,3,5 - trimethyl-2,4,6-tri-(3,5-di-tert-butyl-4-hydroxybenzyl) benzene.

8. A composition according to claim 6 in which said primary antioxidant is a mixture of 1,3,5-trimethyl-2,4,6-tri-(3,5-di-tert-butyl-4-hydroxybenzyl) benzene and 2,6-di-tert-butyl-4-methylphenol.

9. A composition according to claim 6 in which said primary antioxidant is tetra-[3(3,5 - di-tert-butyl-4-hydroxyphenyl)propionate] of pentaerythritol.

10. A composition according to claim 6 in which said primary antioxidant is a mixture of tetra-[3(3,5-di-tert-butyl-4-hydroxyphenyl)propionate] of pentaerythritol and 2,6-di-tert-butyl-4-methylphenol.

11. A composition according to claim 6 in which said talc is acicular-platy talc.

12. A composition according to claim 8 in which said talc is acicular-platy talc.

13. A composition according to claim 10 in which said talc is acicular-platy talc.

References Cited

UNITED STATES PATENTS

| | | | |
|---|---|---|---|
| 3,157,614 | 11/1964 | Fischer | 260—41 |
| 3,425,980 | 2/1969 | Baum | 260—41 |

MORRIS LIEBMAN, Primary Examiner

J. H. DERRINGTON, Assistant Examiner

U.S. Cl. X.R.

106—308; 260—41.5, 45.85, 45.95